United States Patent [19] [11] 3,950,255
Ishii et al. [45] Apr. 13, 1976

[54] SUPPORTED SEMI-PERMEABLE MEMBRANES

[75] Inventors: Kiyoshi Ishii; Shobu Konomi, both of Ohi, Japan

[73] Assignee: Daicel Ltd., Osaka, Japan

[22] Filed: Nov. 6, 1974

[21] Appl. No.: 521,520

[30] Foreign Application Priority Data
Nov. 9, 1973  Japan............................ 48-126028

[52] U.S. Cl. ............................ 210/490; 210/500 M
[51] Int. Cl.² .......................................... B01D 25/04
[58] Field of Search .......... 210/23, 321, 490, 500 M

[56] References Cited
UNITED STATES PATENTS

| | | | |
|---|---|---|---|
| 2,197,805 | 4/1940 | Lovett...................... | 210/500 M X |
| 3,556,305 | 1/1971 | Shorr........................ | 210/500 M X |
| 3,556,992 | 1/1971 | Massucco................. | 210/500 M X |
| 3,762,566 | 8/1971 | DelPico.................... | 210/500 M X |
| 3,894,166 | 7/1975 | Brown et al............... | 210/500 M X |

*Primary Examiner*—Frank A. Spear, Jr.
*Assistant Examiner*—Richard W. Burks
*Attorney, Agent, or Firm*—Woodhams, Blanchard and Flynn

[57] ABSTRACT

Supported semi-permeable membranes are prepared by coating a membrane-forming solution directly on a membrane support, said membrane support comprising a woven fabric selected from (1) a woven fabric made of mixed yarns and formed by employing as a part of the weft and/or warp yarns a yarn composed of a component soluble in a solvent used for forming the membrane-forming solution, (2) a woven fabric composed of a blended yarn including as one blend component fibers composed of a component soluble in a solvent used for forming the membrane-forming solution and (3) a woven fabric having its surface coated with a polymer soluble in a solvent used for forming the membrane-forming solution.

8 Claims, No Drawings

SUPPORTED SEMI-PERMEABLE MEMBRANES

BACKGROUND OF THE INVENTION

1. Field of the Invention

This invention relates to a process for preparing a supported semi-permeable membrane by coating a membrane-forming solution directly onto a membrane support. More particularly, this invention relates to a process for preparing a supported semi-permeable membrane which has a strong bond between the semi-permeable membrane and the support and in which the semi-permeable membrane does not substantially peel off the support during use.

2. Description of the Prior Art

In conventional semi-permeable membranes used for ultra-filtration or reverse osmosis, when such membranes are used in the form of a cast plate or cylinder, they are supported on the permeated liquid side by woven fabrics, filter papers and other porous substances, or a membrane-forming solution is directly coated onto the surface of a porous substance such as a woven fabric or the like.

When a woven fabric acting as a membrane support is used as the back lining, if a pressure is imposed from the supported side of the membrane or if a compressive vibration occurs during operation, the semi-permeable membrane is apt to separate from the support and the semi-permeable membrane, which is generally composed of a material having relatively low strength, is readily damaged and broken. When a membrane-forming solution is cast directly onto a support, the solution infiltrates into the interstices of the mesh structure of the support. The tendency of peeling of the semi-permeable membrane from the support is reduced to some extent by the thus-obtained anchoring effect or mechanical interlock effect.

In general, in semi-permeable membranes which are used over a long time period, they are likely gradually to peel from their supports owing to repetitions of compression and pressure reduction during use. Therefore, a method which comprises casting a membrane-forming solution directly onto a support provides no fundamental solution of the problem of preventing peeling of the membrane.

SUMMARY OF THE INVENTION

It is, therefore, a primary object of this invention to provide a process for preparing supported semi-permeable membranes which can overcome the foregoing disadvantages present in the conventional methods. In this invention, the above object is attained by a process for preparing supported semi-permeable membranes comprising coating a membrane-forming solution directly onto a membrane support, wherein the membrane support is a woven fabric selected from the group consisting of (1) a woven fabric made of mixed yarns wherein a part of the weft and/or warp yarns is composed of a component soluble in a solvent used for forming the membrane-forming solution, (2) a woven fabric composed of a blended yarn including as one blended yarn component a fiber composed of a component soluble in a solvent used for forming the membrane-forming solution and (3) a woven fabric having its surface coated with a polymer soluble in a solvent used for forming the membrane-forming solution.

At present, semi-permeable membranes used for ultra-filtration or reverse osmosis are generally prepared by a method comprising casting a viscous solution of an organic macro-molecular substance and dissolving the solvent and/or a swelling agent out of the solution into non solvent, which dissolves the solvent and the swelling agent but membrane forming material, to form a semi-permeable membrane having a microporous structure.

As the materials for forming the semi-permeable membranes, there are generally employed cellulose acetate, cellulose derivatives and polyamides. For example, when a cellulose acetate semi-permeable membrane is to be prepared, cellulose acetate is dissolved together with a swelling agent into acetone as the solvent, the thus-obtained membrane-forming solution is coated onto the surface of a woven fabric composed of nylon or a polyester, and then the coated fabric is immersed in cold water thereby to form a semi-permeable membrane supported by the nylon or polyester fabric.

In the thus-formed supported semi-permeable membrane, the semi-permeable membrane is not bonded to the support by melt adhesion of the macromolecular substance at the interface with the fabric, but rather the membrane-forming solution infiltrates into the interstices of the weave mesh structure of the fabric support and the membrane is attached to the fabric support only by the so-called anchor effect (or the mechanical interlocking effect). Accordingly, as pointed above, upon repetitions of compression and pressure reduction, the semi-permeable membrane is generally likely to peel from the support.

In the semi-permeable membranes supported by a fabric, prepared according to the process of this invention, since solvent adhesion portion is at least partially present at the interface between the membrane and support, the bonding state between the membrane and fabric support is greatly strengthened in comparison with conventional supported semi-permeable membranes in which the membrane is bonded to the support only by the anchor effect. The supported semi-permeable membrane prepared according to the process of this invention has a much improved resistance to repetitions of compression and pressure reduction, and simultaneously, the general mechanical strength thereof is increased. In fact, in the supported semi-permeable membrane prepared according to this invention, even if one intentionally tries to peel the semi-permeable membrane from the support, the semi-permeable membrane will break at the solvent-adhesion portion, and it is impossible to peel the membrane from the support, contary to the case of conventional supported semi-permeable membranes.

In the mixed woven fabric or blended woven fabric used in this invention, it is preferred that the mixing or blending ratio of the soluble yarn or fiber component to the non-soluble yarn or fiber component is within a range of from 1/20 to 1/100, especially about 1/50, parts by weight.

When a polymer is coated on the surfaces of the fibers of the fabric, the thickness of the polymer coating is from 1 to 15 microns, preferably about 5 microns.

In both the mixed woven fabric and the blended woven fabric, used as a membrane support in this invention, there can be employed as the soluble yarn or fiber component present in minor quantity in the fabric, a yarn or fiber made of any substance which is soluble in one or more of the solvent components of the membrane-forming solution. This yarn or fiber component can be readily selected by taking into consideration the known solubilities of filament-forming substances in one or more of such solvents. For example, acetate filaments are soluble in the solvents for cellulose acetate membrane-forming solutions. Cellulose acetate filaments are also soluble in the solvents for acrylonitril-vinyl-pyrrolidone copolymer membrane-forming solutions. Thus, when such yarn component contacts the membrane-forming solution, it is dissolved, in part or in its entirety, by the solvent so as to be in co-solution with the membrane-forming material. When the solvent is removed, the dissolved yarn component is resolidified and it is attached by a type of intermolecular bond to the membrane which co-solidifies more or less simultaneously therewith. The resolidified yarn or fiber component remains as part of the fabric and is intimately associated and intermingled with the other yarn or fiber component whereby the membrane is firmly attached to the fabric.

The other yarn or fiber component or components of the fabric is not soluble in the solvent so that it remains intact during formation of the membrane. It can be selected from those fiber-forming substances which are insoluble in the solvent or solvents of the membrane-forming solution. For example the other yarn component can be polyamide or polyester when a cellulose acetate semi-permeable membrane is formed.

In the case of the polymer coating, the polymer is selected so as to form an adherent film on the substrate fabric and to be soluble in one or more solvents of the membrane-forming solution. This selection can be made taking into account the known solubility and film-forming and adhesive properties of polymers. For example, ABS resin adheres to nylon fabrics and it is soluble in acetone. The mechanism of action of the polymer is similar to that of the soluble yarn or fiber described above, but in this instance the membrane is bonded to the entire surface of the polymer film and it is even more resistant to peeling.

In the case of the mixed woven fabric, if the yarn of a low mixing ratio is dyed, the trimming or cutting can be performed conveniently.

This invention will now be further described by reference to the following illustrative Examples.

EXAMPLE 1

A homogeneous solution having the following composition was defoamed to form a membrane-forming solution:

| | |
|---|---|
| Cellulose acetate | 20 percent by weight |
| (Acetylation degree = 54.6 percent, molecular weight = 5.2 × 10$^4$) | |
| Acetone | 47 percent by weight |
| 1,4-Dioxane | 22 percent by weight |
| 10 percent Aqueous solution of magnesium perchlorate | 11 percent by weight |

The thus-formed membrane-forming solution was cast on a woven fabric of nylon filaments mixed with acetate filament yarns at a mixing ratio of 50/1, and the solvent was allowed to evaporate in air for a period of time. Then, the fabric was immersed in ice water maintained at 0°C. to obtain a supported semi-permeable membrane.

The bonding between the semi-permeable membrane and the acetate fibers was tested by cutting out the cellulose acetate semi-permeable membrane-nylon yarn bonded area and subjecting samples to a tensile test using a tensile tester. By this test, it was confirmed that the semi-permeable membrane was broken before the semi-permeable membrane was peeled from the support.

The water-permeation and desalting effects of the thus-obtained supported semi-permeable membrane were measured by employing an aqueous solution containing 3500 ppm of sodium chloride under a pressure of 42 Kg/cm$^2$. The results shown below were obtained.

| | Supported Semi-permeable Membrane | Comparison (Non-supported Semi-permeable Membrane |
|---|---|---|
| Water Flux | 0.80 | 0.79 |
| Salt Rejection | 97.5 | 97.7 |

As is apparent from the above results, the desalting and water permeation properties of the supported semi-permeable membrane were substantially equal to those of the semi-permeable membrane formed without using a support.

EXAMPLE 2

The procedure of Example 1 was repeated in the same manner except that there was used a nylon filament woven coated fabric formed by immersing a nylon filament woven fabric in a dilute solution of an ABS resin in acetone and then air-drying the fabric to form an ABS resin coating on the surface of the fabric, in place of the acetate filament-nylon filament blended woven fabric employed in Example 1. In the resulting supported semi-permeable membrane, different from the supported semi-permeable membrane obtained in Example 1, the entire surface of the semi-permeable membrane was bonded by melt adhesion to the fabric support, and the semi-permeable membrane could not be peeled from the support at all. (In this case, the thickness of the coating was about 10 microns). The water-permeation and desalting effects of the thus-obtained supported semi-permeable membrane were measured by employing an aqueous solution containing 3500 ppm of soldium chloride under a pressure of 42 Kg/cm$^2$. The results shown below were obtained.

| | Supported Semi-permeable Membrane | Comparison (Non-supported Semi-permeable Membrane |
|---|---|---|
| Water Flux | 0.78 | 0.80 |
| Salt Rejection | 97.0 | 96.8 |

EXAMPLE 3

A semi-permeable membrane supported on a blended woven fabric, which was prepared in the same manner as in Example 1, was shaped into a tube having a diameter of 14 mm and a length of 45 mm. This tubular supported semi-permeable membrane and a tubular semi-permeable membrane of the same form, prepared by using as a support a nylon fabric free of acetate filaments, were operated under reverse osmosis conditions for a long time and by intentionally causing a pulsating pressure change between 50 Kg/cm$^2$ and 0 Kg/cm$^2$ by using a piston pump free of an accumulator. The properties of both the semi-permeable membranes were compared. As a result, it was found that the semi-permeable membrane supported by the mixed woven fabric had a higher resistance to peeling caused by the pressure pulsation.

The liquid used for this test was an aqueous solution containing 0.35 percent sodium chloride. The properties of both the semi-permeable membranes measured when the above test was conducted for 24 hours were as follows:

|  | Semi-permeable membrane supported by mixed woven fabric | Semi-permeable membrane supported by non-mixed woven fabric |
|---|---|---|
| Water Flux | 0.9 | 1.3 |
| Salt Rejection | 95 | 83 |

For comparison, prior to the above test for determination of the resistance to pulsation, the test was conducted for 25 hours without causing pulsations by employing an accumulator. The results shown below were obtained.

|  | Semi-permeable membrane supported by mixed woven fabric | Semi-permeable membrane supported by non-mixed woven fabric |
|---|---|---|
| Water Flux | 1.0 | 0.9 |
| Salt Rejection | 97.0 | 97.5 |

The embodiments of the invention in which an exclusive property or privilege is claimed are defined as follows:

1. In a supported semi-permeable membrane, the improvement which comprises: the support is selected from the group consisting of (1) a woven fabric made of at least two different yarn components, wherein one yarn component is soluble in the same solvent or solvents as the membrane and the other yarn component or components is substantially insoluble in said solvent or solvents, (2) a woven fabric made of blended yarns of at least two different fibers, wherein one fiber is soluble in the same solvent or solvents as the membrane and the other fiber or fibers is substantially insoluble in said solvent, and (3) a woven fabric having a surface coated with a polymer film which is soluble in the same solvent or solvents as the membrane, the membrane having been formed on said support from a solution thereof in a solvent which is also a solvent for said one yarn component, said one fiber or said polymer, whereby the membrane is firmly bonded to said one yarn component, said one fiber or said polymer, by co-solidification therewith from said solvent solution.

2. A supported semi-permeable membrane as claimed in claim 1, in which said support consists of (1) and the weight ratio of said one yarn component to the other yarn component or components of said fabric is from 1/20 to 1/100.

3. A supported semi-permeable membrane as claimed in claim 1, in which said support consists of (2) and the weight ratio of said one fiber component to the other fiber component or components of said fabric is from 1/20 to 1/100.

4. A supported semi-permeable membrane as claimed in claim 2, in which said membrane is made of cellulose acetate, said one yarn component is acetate filament and said other yarn component is a polyamide or polyester.

5. A supported semipermeable membrane as claimed in claim 3, in which said membrane is made of cellulose acetate, said one fiber component is acetate filament and said other fiber component is a polyamide or polyester.

6. A supported semi-permeable membrane as claimed in claim 1, in which said support consists of (3) and the thickness of said polymer film is from 1 to 15 microns.

7. A supported semi-permeable membrane as claimed in claim 6, in which said membrane is made of cellulose acetate, said polymer is an acrylonitrile-butadiene-styrene polymer and said fabric is made of polyamide or polyester.

8. A semi-permeable membrane supported on a fabric and in which the membrane is directly bonded to the support fabric by means of monolithic co-soluble solid interfacial portions of both said membrane and said fabric.

* * * * *